United States Patent [19]

Kubo

[11] Patent Number: 5,551,161
[45] Date of Patent: Sep. 3, 1996

[54] FIGURE COORDINATE MARKING APPARATUS

[76] Inventor: Akio Kubo, 655 Yamanouchi,, Kamakura-shi, Kanagawa-ken, Japan

[21] Appl. No.: 360,998

[22] Filed: Dec. 20, 1994

[30] Foreign Application Priority Data

Feb. 4, 1994 [JP] Japan .................................. 6-012432

[51] Int. Cl.⁶ .............................. G01B 5/004; G01B 5/26
[52] U.S. Cl. .............................. 33/503; 33/1 CC; 33/1 M
[58] Field of Search .................................. 33/503, 1 CC,
33/1 M, 18.1, 20.1, 20.2, 26, 121, 124,
123, 122, 773

[56] References Cited

U.S. PATENT DOCUMENTS

| | | | |
|---|---|---|---|
| 2,121,211 | 6/1938 | Padva et al. | 33/122 |
| 2,751,273 | 6/1956 | Rankin | 33/18.1 |
| 4,004,083 | 1/1977 | Norem. | |
| 4,127,941 | 12/1978 | Hoover. | |
| 4,616,419 | 10/1986 | Kubo | 33/122 |
| 4,617,740 | 10/1986 | Mikio | 33/122 |
| 4,621,959 | 11/1986 | Kishi et al. . | |
| 4,791,576 | 12/1988 | Tanaka et al. . | |
| 5,115,569 | 5/1992 | Kubo | 33/1 M |

FOREIGN PATENT DOCUMENTS

92/06347   4/1992   WIPO .................................. 33/1 M

*Primary Examiner*—Christopher W. Fulton
*Attorney, Agent, or Firm*—David O'Reilly

[57] ABSTRACT

A figure coordinate marking apparatus having a fine movement device capable of easily and accurately adjusting the marker to a specific coordinate position of a figure and a marker capable of clearly indicating a marking point. The figure coordinate marking apparatus is comprised of a main body having rollers provided at each end of a straight horizontal axle perpendicular to a running direction thereof so that the main body can run in only the straight running direction, a display device, an input device, and calculating device. A measuring lever is pivotably supported on the main body to rotate right or left relative to the running direction on a horizontal plane. A first wheel for fine movement substantially in the running direction of the main body, and a second wheel for fine movement in a turning direction of the measuring lever are provided. The first wheel and second wheel are normally kept a small distance above a sheet of paper on which a figure to be measured is drawn, by an elastic member.

20 Claims, 7 Drawing Sheets

FIGURE COORDINATE MARKING APPARATUS

BACKGROUND OF THE INVENTION

1. Field of the Invention

The present invention relates to a figure coordinate marking apparatus for marking a specific coordinate position, such as a centroid of a plane figure onto the plane figure by tracing along a contour of the plane figure.

2. Background Information

In a prior figure coordinate marking apparatus, a specific coordinate position, such as a known centroid etc. of a known figure is entered though an input device in the main body of the figure coordinate marking apparatus. An internal calculating device in the figure coordinate marking apparatus calculates the deviation of coordinates of a marker provided adjacent to a tracing point by a tracing portion of a measuring lever on the figure coordinate marking apparatus, from the coordinates of the figure entered representing the specific coordinates position. The display device of the figure coordinate marking apparatus displays the deviation.

The measuring lever is then moved so that the deviation of the coordinates of the marker from the coordinate of the figure entered representing the specific coordinates position becomes zero on the display, and the marker moved with the measuring lever then marks the specific coordinate position of the figure on the figure.

However, if a precise drawing is required, the prior figure coordinate marking apparatus requires very high skill to accurately adjust the marker to the specific coordinate position of the figure, often resulting in error to a great degree.

Also, the prior art has the disadvantage that indication of the marking point is often unclear even if the marker is accurately adjusted to the specific coordinate position of the figure.

SUMMARY OF THE INVENTION

With a view to solve the foregoing problems of the prior art, it is an object of the present invention to provide a figure coordinate masking apparatus which comprises a fine moving means capable of easily and accurately adjusting a marker on the figure coordinate marking apparatus to a specific coordinate position of a figure with a marker capable of clearly marking a point.

A figure coordinate marking apparatus according to the present invention is comprised of a main body having rollers provided at each end of a horizontal axle perpendicular to the running direction thereof so that the main body can run in only a straight running direction, a display device, an input device, and calculating means. The apparatus further comprises a measuring lever pivotably supported on the main body to rotate right or left relative to the running direction in a horizontal plane. The measuring lever has a marker and a tracing portion for tracking a figure to be measured to obtain coordinates, area, length or the like from a figure, from which the calculating means calculates a specific coordinate position of the figure. The display device indicates any difference between the specific coordinate position of the figure and a coordinate position of the marker, and the tracing portion is moved to reduce the difference to zero.

The figure coordinate marking apparatus further has a first wheel for fine movement in a running direction of the main body and a second wheel for fine movement in a turning direction of the measuring lever. The first wheel and the second wheel normally maintains a small distance above a sheet of paper on which the figure is drawn, by an elastic member.

The first wheel can be rotatably supported at an end of the measuring lever by a horizontal axle perpendicular to a straight line connecting a supporting fulcrum of the measuring lever with a tracing point of the tracing portion. Otherwise, the first wheel can be supported at a center portion of the measuring lever, the horizontal axle of the first wheel being kept in parallel with the horizontal axle of the rollers.

The horizontal axle of the first wheel may be kept in parallel with the rollers by a link arrangement of a belt extending between the first wheel and a supporting fulcrum for the measuring lever. Otherwise, the horizontal axle of the first wheel may be kept in parallel with the rollers by a link arrangement of bars extending between the first wheel and a supporting fulcrum for the measuring lever.

The second wheel may be rotatably supported by a horizontal axle directed toward a supporting fulcrum for the measuring lever.

The marker can comprise a center needle for pressing a sheet of paper and a rotating member rotatably supported on the marker for holding a pencil lead to draw a small circle around the center needle.

As described above, the measuring lever of the figure coordinate marking apparatus of the present invention moves near to the specific coordinate position of the figure in a manner similar to the prior art. In a final fine movement area, the first and second wheels rotate while pressed onto the paper against the elasticity of the elastic member holding them. This easily and accurately allows the marker to make fine movements to the specific coordinate position of the figure.

After the marker is pointed at the specific coordinate position of the figure, the center needle of the marker is pressed on the paper and the rotating member holding the pencil lead rotates a turn. This draws a small circle around the center needle with the center needle being at the center, thereby allowing the marked point to be easily confirmed after drawing. It should be noted that after drawing and confirming, the small circle drawn by the pencil lead can be erased with an eraser to get rid of excess marks on the figure.

Other objects and advantages and novel features of the invention will become more apparent from the following portion of this specification and from the accompanying drawings.

DETAILED DESCRIPTION OF THE INVENTION

Figure 1:
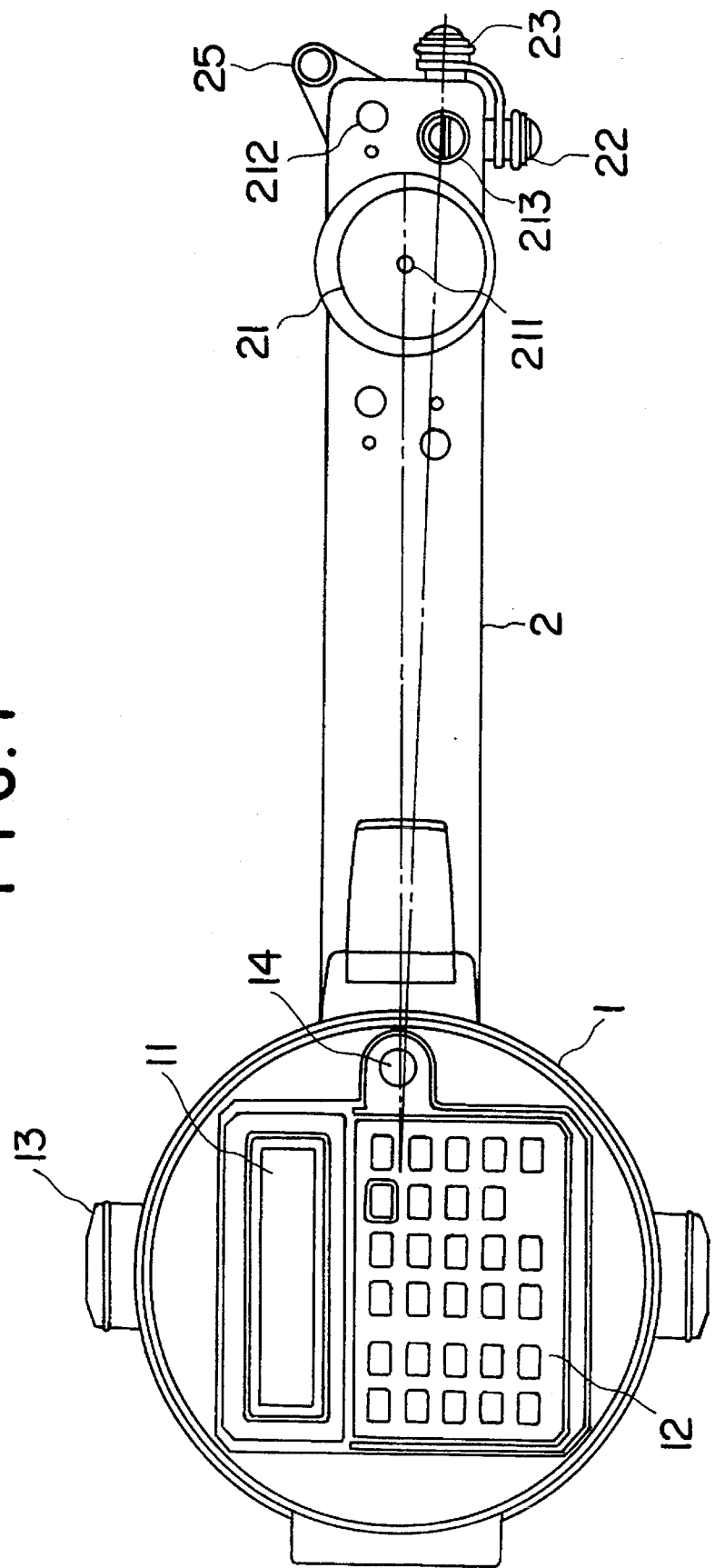
FIG. 1 is a plan view of a first embodiment of a figure coordinate marking apparatus according to the present invention.
Figure 2:
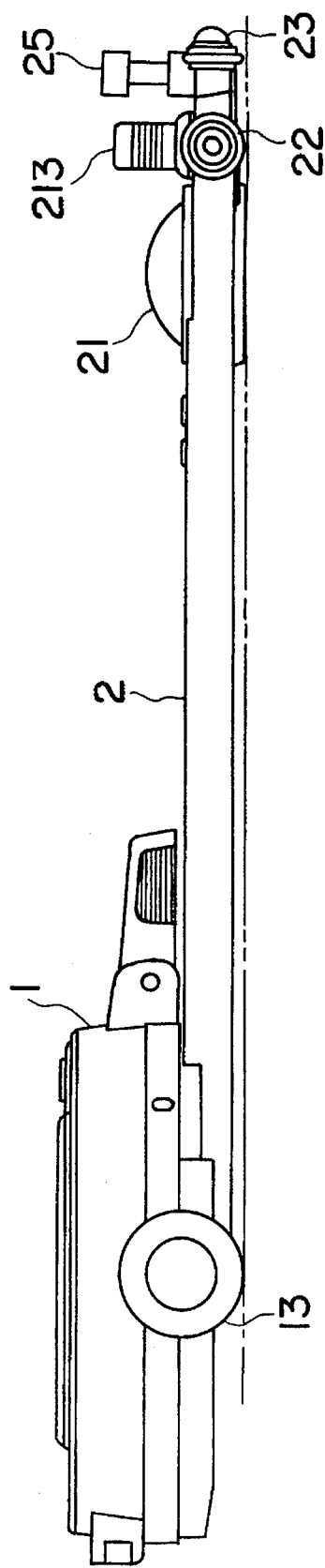
FIG. 2 is a longitudinal side view of the first embodiment.
Figure 3:
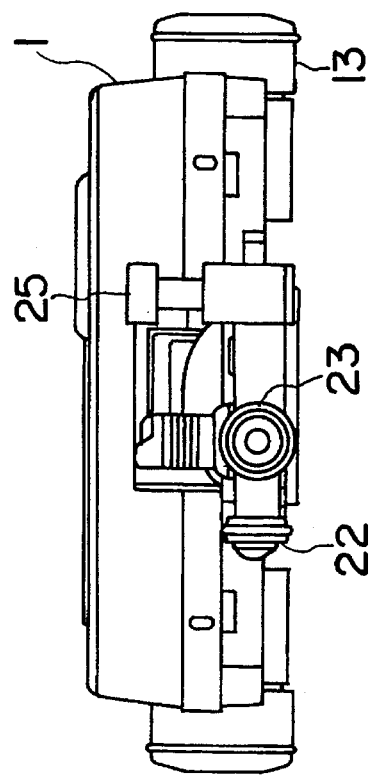
FIG. 3 is an end view of the first embodiment.

The following describes a first embodiment of the present invention by reference to the accompanying drawings.

The figure coordinate marking apparatus is comprised of main body 1 having display device 11, input device 12, internal calculating device (not shown), rollers 13 rotatably supported on a side of main body 1 at each end of a straight horizontal axle perpendicular to a running direction of main body 1 so that main body 1 can run only in the running direction. The figure coordinate marking apparatus also comprises measuring lever 2 supported at fulcrum 14 on main body 1 so as to be turnable right and left relative to the running direction of main body 1.

Figure 4:
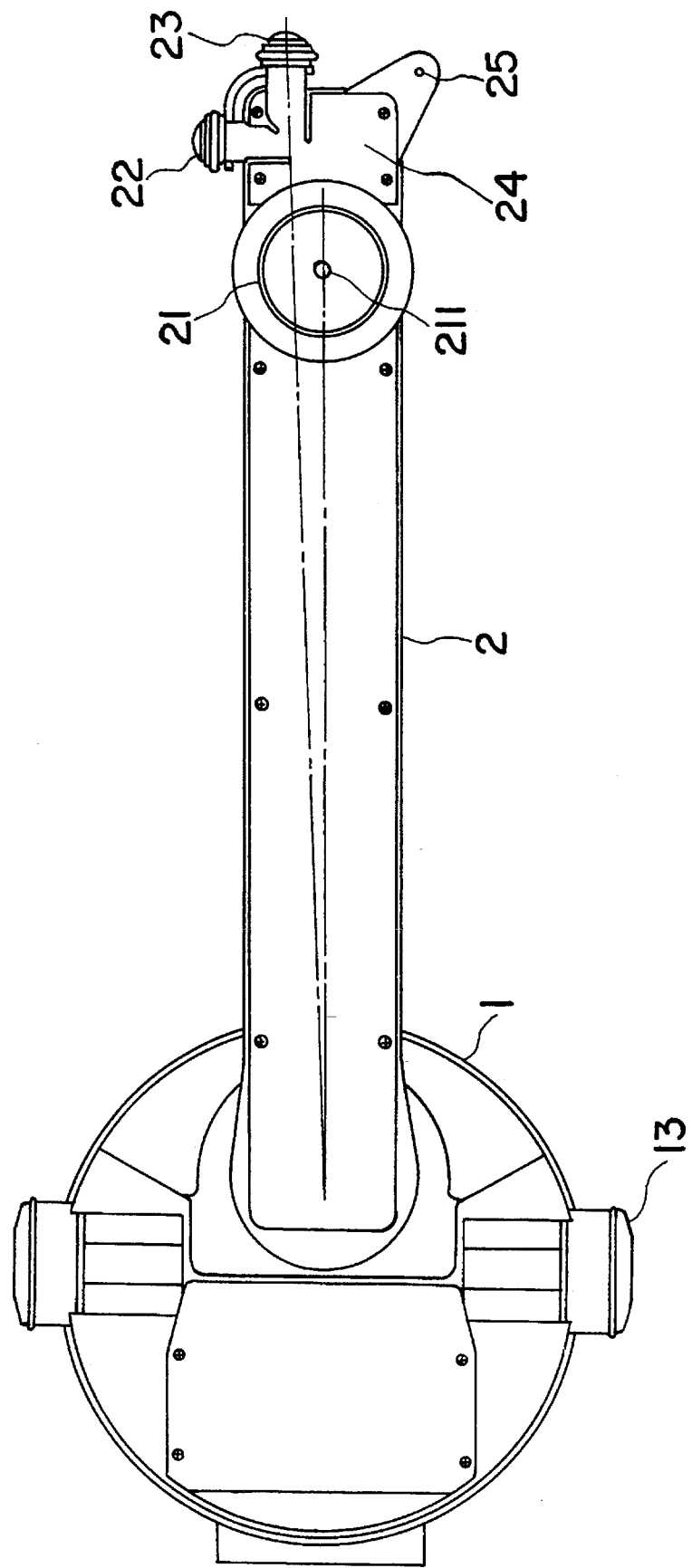
FIG. 4 is a rear view of the first embodiment.

Measuring lever 2 has tracing portion 21 at the end thereof. First wheel 22 for fine movement of the whole apparatus including main body 1 and measuring lever 2, in the running direction of main body 1, and second wheel 23 for fine movement of measuring lever 2 in the turning direction of measuring lever 2 are respectively supported at the end of measuring lever 2. Both first wheel 22 and second wheel 23 are held by elastic member 24 (FIG. 4) such as, a plate spring or the like on a rear side of measuring lever 2 to maintain a small distance above a sheet of paper on which a figure is being drawn.

A horizontal axle of first wheel 22 is held at right angles to a straight line connecting supporting fulcrum 14 of main body 1 with tracing point 211 of tracing portion 21 of measuring lever 2.

A horizontal axle of second wheel 23 is held directly in line with supporting fulcrum 14.

Further, measuring lever 2 has marker 25 supported at the end thereof. Marker 25 is comprised of a center needle for pressing on a sheet of paper and a rotating member rotatably connected to and supported on the marker for holding a pencil lead for drawing a small circle around the center needle.

Any difference between the coordinate positions of marker 25 and tracing point 211 are stored as data in a calculating device (not shown). The calculating device calculates a specific coordinate position of a figure to be measured and also a difference between the specific coordinate position of the figure and a coordinate position of marker 25 using the above data stored in the calculating device as an offset. Display device 11 displays the specific coordinate position and the difference to show a point where marker 25 should be positioned.

In turn, the following describes the operation of the figure coordinate marking apparatus. Input device 12 is used to enter calculation commands for calculating specific coordinate positions of the figure, such as a centroid of the figure. After that, tracing point 211 is moved along the contour of the figure to obtain and store X and Y coordinates of minutely sectioned positions of the contour of the figure in the calculating device. As the figure is sectioned minutely enough, it performs a continuous measurement.

If the figure to be measured is defined by a plurality of straight lines, a representation of the figure is entered before measurement. The tracing point is then moved to vertexes of the figure defined by straight lines, coordinates of which are read when a coordinate read button is pressed. Tracing along the contour of the figure between the vertexes can be omitted on the way from a vertex to a next vertex.

A continuous measurement selector button 212 provided at the end of measuring lever 2 is used to select each representative measurement of the figure or the continuous measurement of figure. If a figure to be measured is defined by a plurality of straight lines, coordinate read button 213 is pressed at vertex positions of the figure, thereby entering the coordinates of the vertexes into the calculating device.

After the coordinates along the contours or all the vertexes of the figure are read, display device 11 displays the necessary data.

The necessary data are the specific coordinates of, for example, the centroid of the figure and the coordinates of a current marker position and a difference between the specific coordinates and the coordinates of the marker. Measuring lever 2 is moved until the difference is zero so that a position of the marker goes to the specific coordinate position.

In this case, as it is difficult to precisely move marker 25 to a specific coordinate position, first wheel 22 or second wheel 23 is utilized to accurately move the marker near the specific coordinate position. Though the first and second wheels 22, 23 ape normally kept a small distance above the sheet of paper on which a figure is being drawn by elastic member 24, they can be pressed toward the paper and rotated on it so that the marker can be easily and accurately moved to coincide with the specific coordinate position.

Figure 5:
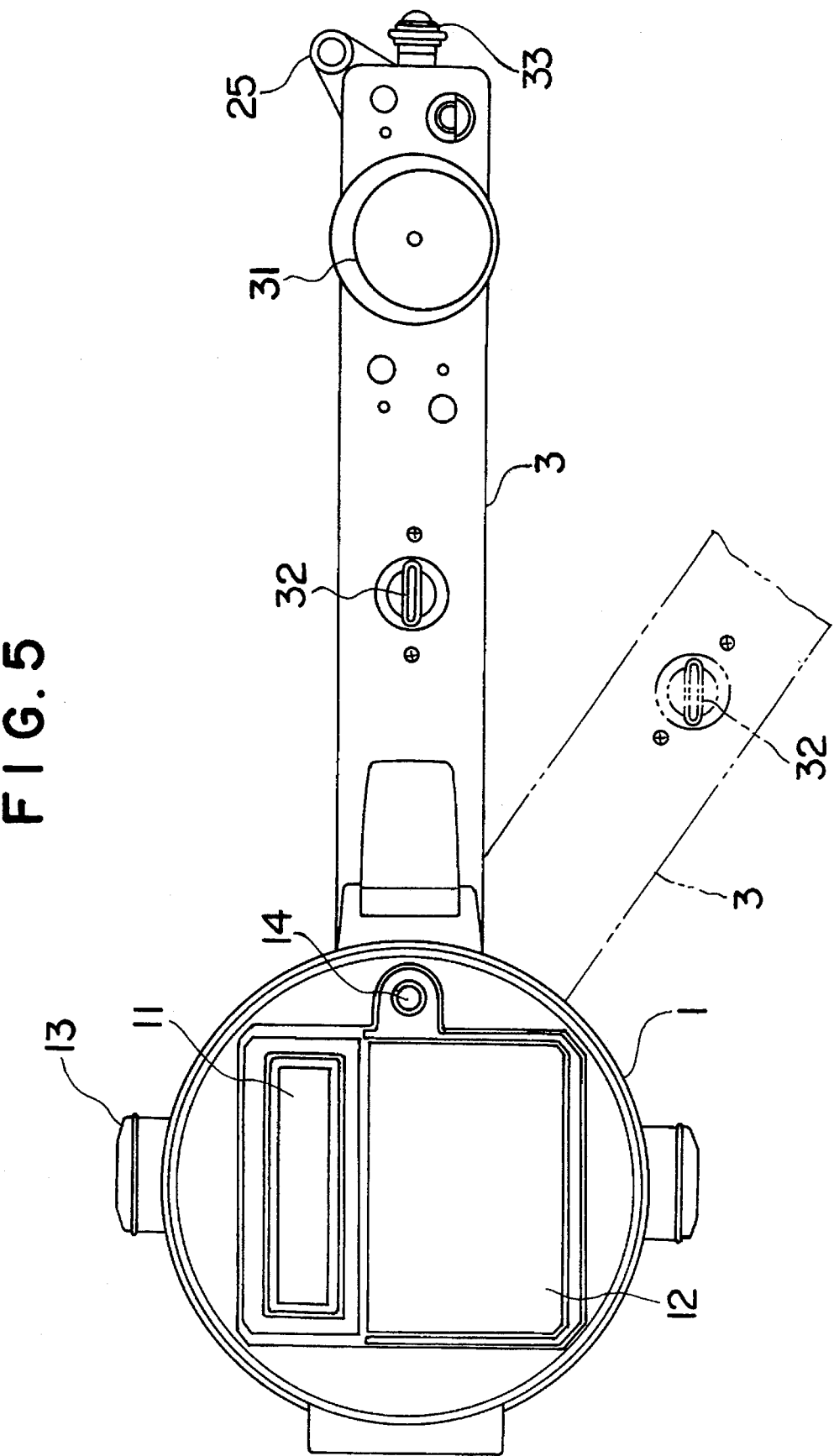
FIG. 5 is a plan view of a second embodiment of the figure coordinate marking apparatus according to the present invention.
Figure 6:
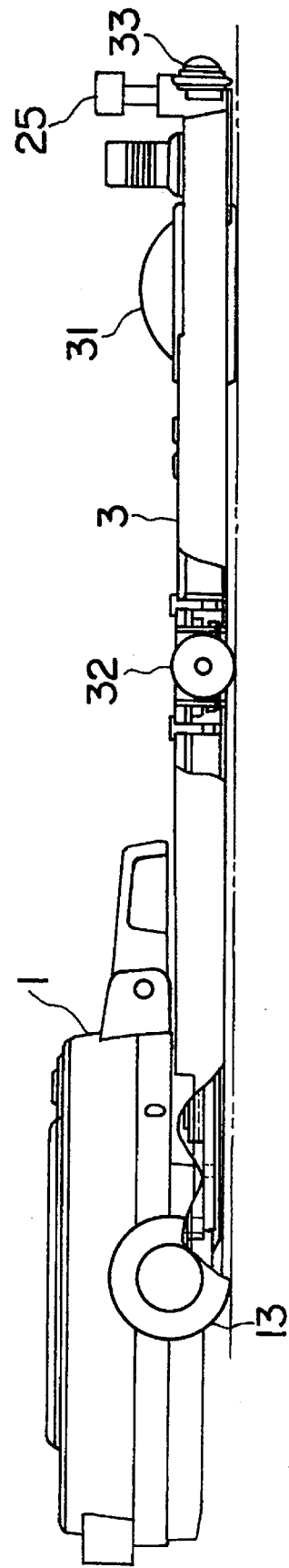
FIG. 6 is a longitudinal side view of the second embodiment.
Figure 7:
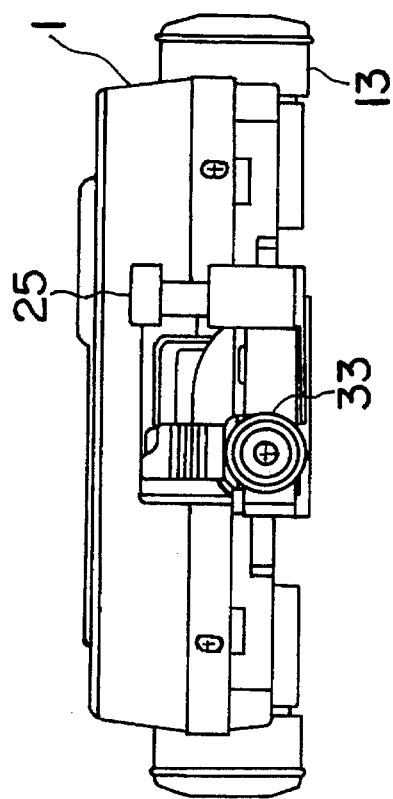
FIG. 7 is an end view of the second embodiment.
Figure 8:
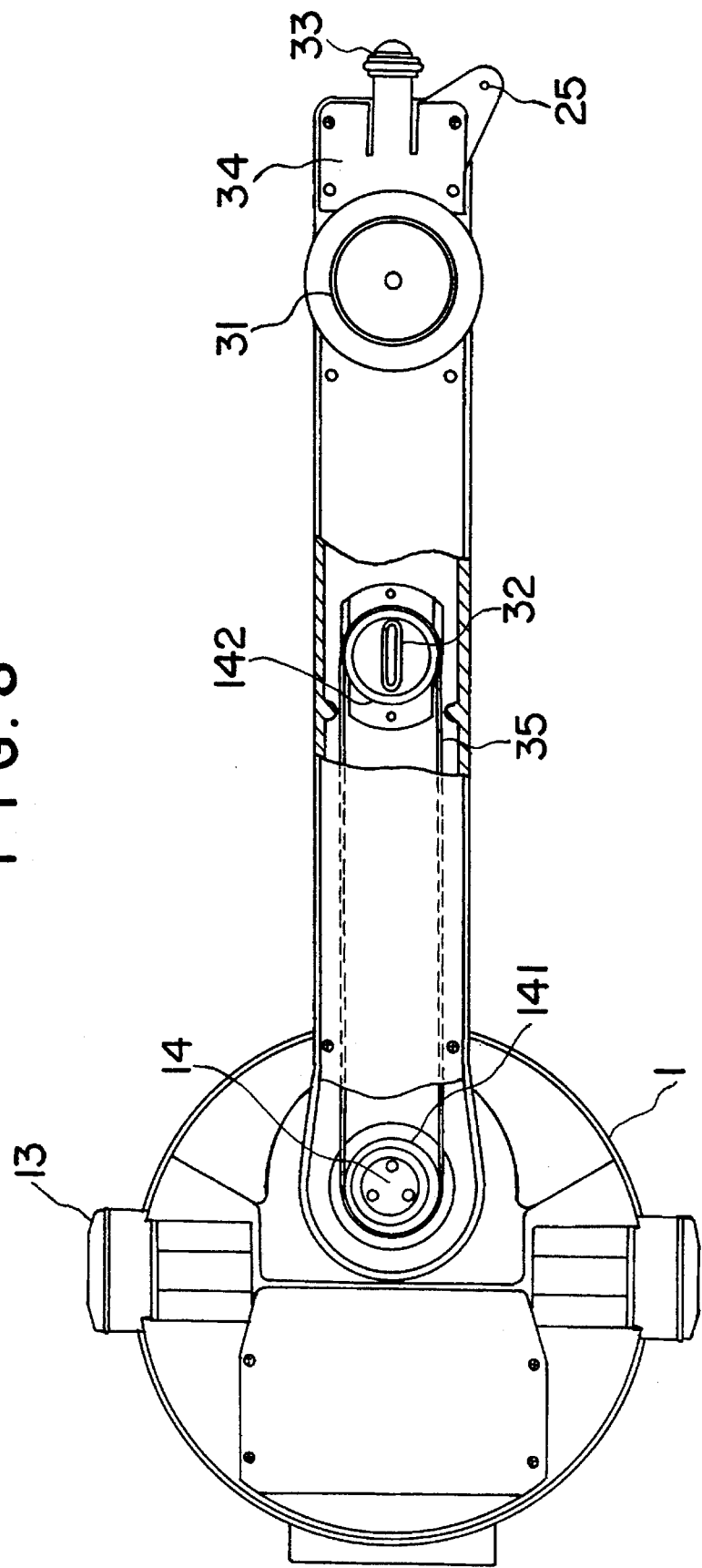
FIG. 8 is a rear view of the second embodiment having a belt link arrangement.

FIG. 5 is a plan view of a second embodiment of the figure coordinate marking apparatus according to the present invention, FIG. 6 is a longitudinal side view of the second embodiment, FIG. 7 is an end view of the second embodiment, and FIG. 8 is a reap view of the second embodiment.

The figure coordinate marking apparatus comprises main body 1 having display device 11, input device 12, internal calculating device (not shown), rollers 13 rotatably supported on a side of main body 1 at each end of a straight horizontal axle perpendicular to a running direction of main body 1 so that main body 1 can run only in the running direction. The figure coordinate marking apparatus also comprises measuring lever 3 supported by fulcrum 14 on main body 1 so as to be turnable right and left relative to the running direction of main body 1.

Measuring lever 3 has tracing portion 31 at the end thereof. Measuring lever 3 also has second wheel 33 fop fine movement of measuring lever 3 in the turning direction of measuring lever 3. Second wheel 33 is held by elastic member 34 such as a plate spring or the like disposed on a rear side of measuring lever 3 to maintain a small distance above the sheet of paper on which a figure is being drawn.

First wheel 32 is supported at a center of measuring lever 3 for fine movement of the whole apparatus including main body 1 and measuring lever 3, in the running direction of main body 1. Further, fixed wheel 141 (FIG. 8) is fixed to supporting fulcrum 14 and slave wheel 142 having the same diameter as fixed wheel 141 is fixed to a horizontal axle of first wheel 32 for rotating the horizontal axle of first wheel 32 around a vertical axle on a horizontal plane. Unslidable belt 35 which is for example a timing belt or the like extending between fixed wheel 141 and slave wheel 142 constitutes a link arrangement.

It should be noted that slave wheel 142 and first wheel 32 are normally kept a small distance above a sheet of paper on which a figure to be measure is drawn by an elastic member (not shown), as in the first embodiment described above.

Figure 9:
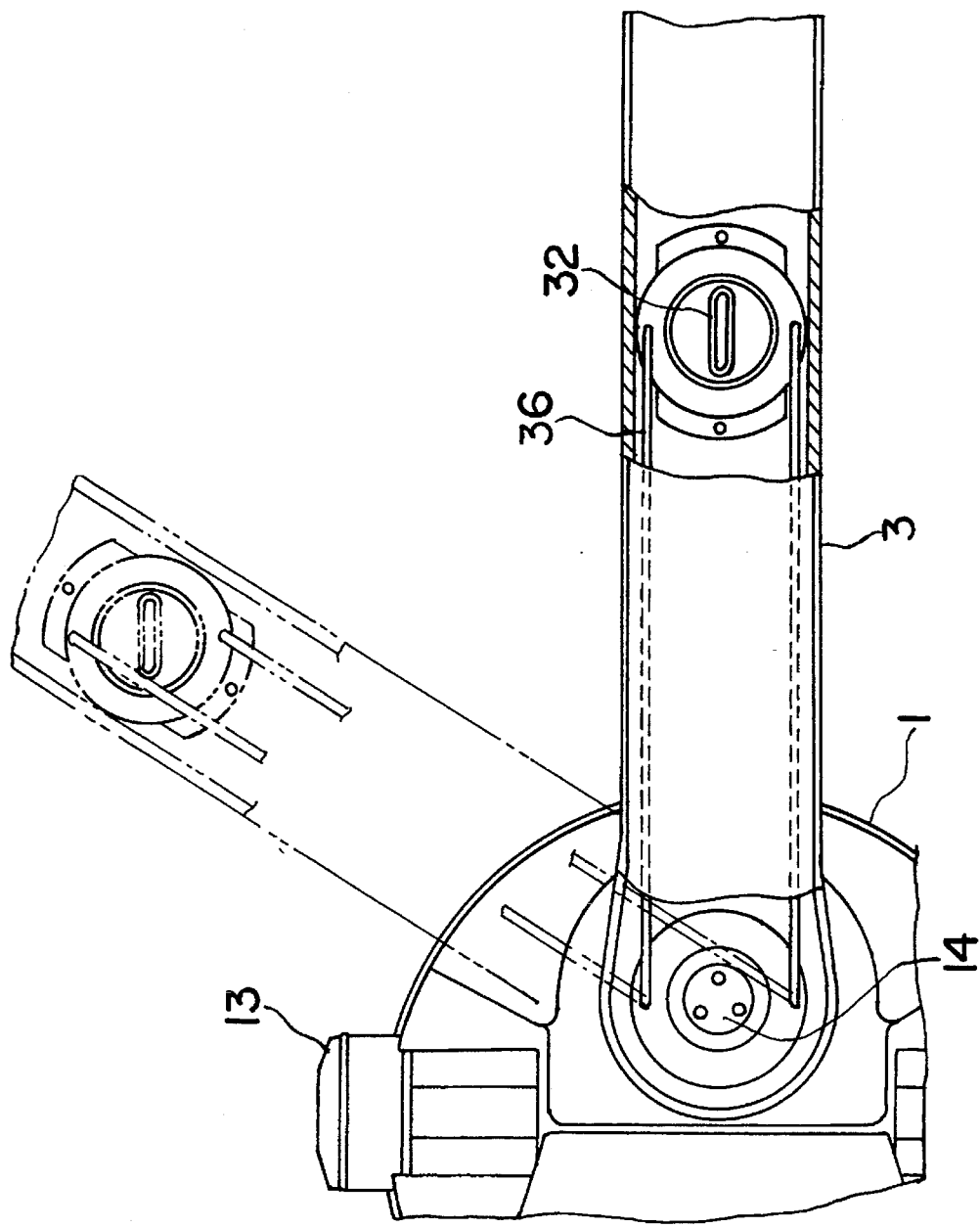
FIG. 9 is a rear view of a part of the second embodiment having a link arrangement of bars.

FIG. 9 is a rear view of another link arrangement comprised of two bars 36 in place of the link arrangement of belt 35 of FIG. 8. Both ends of each of two bars 36 are turnably held in place. Namely one end of each bar 36 is turnably attached to main body 1 while the other end of each bar 36 is turnably attached to a disk fixed to the horizontal axle of first wheel 32. Distances between fulcrums of the both ends of two bars 36 are set equal so that the horizontal axle of first wheel 32 and an axle of roller 13 of main body 1 can be kept parallel irrespective of the turning angle of measuring lever 3. As other arrangements are the same as in the first embodiment, detailed description of them is omitted here.

Operation of the second embodiment is identical with the operation of corresponding parts in the first embodiment except for first wheel 32.

As described above, the horizontal axle of first wheel 32 and the axle of roller 13 of main body 1 can be kept parallel irrespective of the turning angle of measuring lever 3, therefore when first wheel 32 is pressed to move on a sheet of paper to be drawn, a moving direction of measuring lever 3 can coincide with the direction of movement of roller 13, while being independent from a turning angle of measuring lever 3.

As described so far, the figure coordinate marking apparatus of the present invention can calculate a specific coordinate position of a figure to be measured, such as the centroid on the figure, by means of the calculating device. The apparatus also displays a difference of a current position of the marker from the specific coordinate position of the figure. The measuring lever is moved until the difference is zero.

In that case, if the difference approaches zero, the first and second wheels are used for fine movement of the measuring lever so that the marker can easily and accurately come to the specific coordinate position of the figure.

The marker that is of the so-called compass type can clearly point the position to be marked by the position of the center needle and a small circle drawn around the center needle with the pencil lead. The small circle can be erased with an eraser when it is not needed.

While the principles of the invention have been described above in connection with specific embodiments, and particular modifications thereof, it is to be clearly understood that this description is made only by way of example and not as a limitation on the scope of invention.

What is claimed is:

1. A figure coordinate marking apparatus comprising
   a main body having rollers each of which is provided at each end of a horizontal axle perpendicular to a running direction thereof so that the main body can run in only the straight running direction, a display device, an input device, and calculating means,
   a measuring lever pivotably supported on the main body rotatable right or left relative to the running direction on a horizontal plane, said measuring lever having a marker and a tracing portion for tracing a figure to be measured to obtain coordinates, area, length for said figure, said calculating means calculating a specific coordinate position of said figure, and said display device indicating a difference between the specific coordinate position of the figure and a coordinate position of said marker,
   a first wheel for fine movement of said measuring lever substantially in the running direction of the main body,
   a second wheel for fine movement of said measuring lever in a turning direction of the measuring lever,
   spacing means to normally maintain said first and second wheels a small distance above a sheet of paper on which the figure is drawn; said spacing means allowing said first and second wheels to be pressed down on said sheet of paper for fine adjustment.

2. The figure coordinate marking apparatus according to claim 1, wherein the first wheel is rotatably supported at an end of the measuring lever by a horizontal axle perpendicular to a straight line connecting a supporting fulcrum for the measuring lever with a tracing point of the tracing portion.

3. The figure coordinate marking apparatus according to claim 1, wherein the first wheel is rotatably supported at a center portion of the measuring lever, and including means for keeping the horizontal axle of the first wheel parallel to said rollers.

4. The figure coordinate marking apparatus according to claim 3, wherein said means for keeping the horizontal axle of said first wheel parallel to said rollers comprises a belt link arrangement extending between said first wheel axle and said measuring lever supporting fulcrum.

5. The figure coordinate marking apparatus according to claim 3, wherein said means for keeping the horizontal axle of said first wheel parallel to said rollers comprises a link arrangement of bars extending between the first wheel axle and said measuring lever supporting fulcrum.

6. The figure coordinate marking apparatus according to claim 1, wherein the second wheel is rotatably supported by a horizontal axle directly in line with a supporting fulcrum for the measuring lever.

7. The figure coordinate marking apparatus according to claim 1, wherein the marker comprises a center needle for pressing on a sheet of paper and a rotating member rotatably supported on the marker for holding a pencil lead for drawing a small circle around the center needle positioned at a center of the small circle.

8. The figure coordinate marking apparatus according to claim 1, includes means for keeping the horizontal axle of said first wheel parallel to said rollers, said means for keeping the first wheel axle parallel to said rollers comprises a linking arrangement extending between said first wheel axle and a fulcrum on said main body supporting said measuring lever.

9. The figure coordinate marking apparatus according to claim 8, in which said linking arrangement comprises a belt linking arrangement.

10. The figure coordinate marking apparatus according to claim 8, in which said linking arrangement is a linking arrangement of bars.

11. In a figure coordinate marking apparatus comprised of a main body having rollers provided at each end of a longitudinal axle attached to said main body perpendicular to the running direction of said main body, a display device, an input device and calculating means, the improvement comprising;
   a measuring lever pivotably supported at one end to said main body and rotatable right or left of the direction of movement of said main body on a horizontal plane; marking means on said measuring lever, said marking means having a tracing portion for tracing a figure to be measured to obtain area, length, specific coordinates for a figure; said calculating means calculating a specific coordinate position on said figure; said display device displaying the difference between said specific calculated coordinate position and the coordinate position of said marking means; and moving means for moving said measuring lever until said difference being displayed is zero; said moving means comprising first and second wheels on said measuring lever for fine adjusting movement of said measuring lever in the running direction of said main body and fine adjusting movement of said measuring lever in a direction traverse to the direction of movement of said main body.

12. The figure coordinate marking apparatus according to claim 11 in which; said first wheel is rotatably supported at a distal end of said mounting measuring lever by an axle perpendicular to an axis of said measuring lever from a fulcrum connecting said measuring lever to said main body and said tracing portion of said marking means includes a tracing point.

13. The figure coordinate marking apparatus according to claim 12 in which said first wheel is rotatably supported at the approximate center of said measuring lever; and including means for maintaining said axle for said first wheel substantially parallel to said main body axle supporting said rollers.

14. The figure coordinate marking apparatus according to claim 13 in which said means for maintaining said first wheel axle to substantially parallel said main body axle comprises a link arrangement extending between said first wheel axle and said fulcrum.

15. The figure coordinate marking apparatus according to claim 14 in which said link arrangement is a belt linking said axle for said wheels to said fulcrum.

16. The figure coordinate marking apparatus according to claim 14 in which said linking arrangement comprises bars linking said first wheel axle to said fulcrum.

17. The figure coordinate marking apparatus according to claim 11 in which said second wheel is supported by an axle parallel to an axis of said measuring lever from a fulcrum connecting said measuring lever to said main body and a tracing point on said tracing portion of said marking means.

18. The figure coordinate marking apparatus according to claim 17 in which said marking means includes a center pointer adapted to be pressed on a sheet of paper on which a figure is to be drawn; and a rotatable holding member for rotatably holding a pencil to draw a circle with said center pointer at the center of said circle.

19. The figure coordinate marking apparatus according to claim 11 including means for maintaining said axle for said first wheel substantially parallel to said main body axle supporting said rollers; a fulcrum connecting said measuring lever to said main body; said means for maintaining said first wheel axle parallel to said main body axle comprises a belt link arrangement extending between said first wheel axle and said fulcrum.

20. The figure coordinate marking apparatus according to claim 11 including means for maintaining said axle for said first wheel substantially parallel to said main body axle supporting said rollers; a fulcrum connecting said measuring level to said main body; said means for maintaining said first wheel axle parallel to said main body axle comprises a link arrangement of bars extending between said first wheel axle and said fulcrum.

* * * * *